US009941715B2

(12) United States Patent
Chen (10) Patent No.: US 9,941,715 B2
(45) Date of Patent: Apr. 10, 2018

(54) CHARGING SYSTEM FOR SELF-PROPELLED APPARATUS

(71) Applicant: Lumiplus Technology (Suzhou) Co., Ltd., Taicang (CN)

(72) Inventor: Shun-Yi Chen, Taipei (TW)

(73) Assignee: LUMIPLUS TECHNOLOGY (SUZHOU) CO., LTD., Taicang (CN)

( * ) Notice: Subject to any disclaimer, the term of this patent is extended or adjusted under 35 U.S.C. 154(b) by 61 days.

(21) Appl. No.: 15/135,183

(22) Filed: Apr. 21, 2016

(65) Prior Publication Data

US 2017/0271895 A1 Sep. 21, 2017

(30) Foreign Application Priority Data

Mar. 15, 2016 (TW) .............................. 105203535 U (51) Int. Cl.
*H01M 10/46* (2006.01)
*H02J 7/00* (2006.01)
*A47L 9/28* (2006.01)

(52) U.S. Cl.
CPC ............... *H02J 7/0027* (2013.01); *A47L 9/28* (2013.01)

(58) Field of Classification Search
CPC .......... H02J 7/355; H02J 7/0042; H02J 5/005; H02J 7/025
USPC .............. 320/104, 109, 114, 115; 901/1, 46; 700/258
See application file for complete search history.

(56) References Cited

U.S. PATENT DOCUMENTS

| 8,390,251 | B2* | 3/2013 | Cohen ................... A47L 9/2857 320/109 |
| 9,193,065 | B2* | 11/2015 | Wang .......................... B25J 5/00 |
| 2007/0096675 | A1* | 5/2007 | Kim ..................... G05D 1/0225 318/587 |
| 2008/0039974 | A1* | 2/2008 | Sandin .................... G05D 1/028 700/258 |
| 2008/0276408 | A1* | 11/2008 | Gilbert, Jr. .............. A47L 11/34 15/320 |
| 2016/0028265 | A1* | 1/2016 | Bell ........................ H02J 7/025 320/108 |

* cited by examiner

*Primary Examiner* — Edward Tso
(74) *Attorney, Agent, or Firm* — WPAT, PC (57) ABSTRACT

A charging station includes a main body, a central emission module, a supersonic receiver, a controller, and a lateral emission module having a left infrared emitter and a right infrared emitter. The controller drives the left infrared emitter and the right infrared emitter to emit alternatively infrared signals to a first signal area and a second signal area, respectively. When the supersonic receiver receives a supersonic signal from the self-propelled apparatus, the controller drives the central emission module to emit another infrared signal to a third signal area so as to guide the self-propelled apparatus to enter the third signal area. When a distance between the self-propelled apparatus and the charging port is smaller than a predetermined distance, the self-propelled apparatus turns to have a charging-input unit thereof to face the charging port. In addition, a charging system including the charging station and the self-propelled apparatus is also provided.

4 Claims, 11 Drawing Sheets

CHARGING SYSTEM FOR SELF-PROPELLED APPARATUS

This application claims the benefit of Taiwan Patent Application Serial No. 105203535, filed Mar. 15, 2016, the subject matter of which is incorporated herein by reference.

BACKGROUND OF INVENTION

1. Field of the Invention

The invention relates to a charging station and a charging system, and more particularly to the charging station and the charging system that are applicable to self-propelled apparatuses.

2. Description of the Prior Art

Recently, with continuous developments and progresses in technology, many companies have projected tremendous resources to the researches on the robotics. Hence, various robotic devices for diversity purposes have been introduced to the marketplace. Also, smart robotic systems are widely applied to automatic productions, automatic medical facilities, museum tourist guides, auxiliary surgery systems, aerospace exploitations, military applications, domestic services, office services, entertainment purposes, and evenly risk-taking tasks for human.

Domestically, a self-propelled apparatus for indoor cleaning, also called as a robotic cleaner, is basically a cleaning apparatus that can operate automatically and move around the floor to remove dusts and particles thereon.

Since the self-propelled apparatus needs battery power to work, recharging after a period of usage is thus necessary. To achieve fully automatic operations, the existing self-propelled apparatus usually has a function of automatic charging at a charging station. Practically, the charging station has a front emitter to emit infrared signals. In the case that the self-propelled apparatus enters a region of the infrared signals emitted by the charging station, the self-propelled apparatus would receive the infrared signals and then prepare for a recharging at the charging station. However, in some events, the self-propelled apparatus may approach the charging station with an improper angle. In this circumstance, a connection port for charging on the self-propelled apparatus may not engage the corresponding port on the charging station correctly, and thus failure to recharge the self-propelled apparatus might be possible.

SUMMARY OF THE INVENTION

Accordingly, it is the primary object of the present invention to provide a charging station that can provide various signal areas to guide a self-propelled apparatus precisely to approach and thus engage the charging station for recharging.

It is another object of the present invention to provide a charging system that can provide various signal areas in front of the charging station so as to guide the self-propelled apparatus precisely to approach and thus engage the charging station for recharging.

In the present invention, the charging station, for charging a self-propelled apparatus, includes a main body, a central emission module, a lateral emission module, a supersonic receiver and a controller. The main body includes a charging port. The central emission module is located at the main body at a position corresponding to the charging port. The lateral emission module locates at the main body further includes a left infrared emitter and a right infrared emitter located individually to two opposing sides of the central emission module. The supersonic receiver located at the main body is to receive a supersonic signal emitted by the self-propelled apparatus. The controller located at the main body is coupled with the central emission module, the lateral emission module and the supersonic receiver. The controller drives the left infrared emitter and the right infrared emitter to emit alternatively infrared signals to a first signal area and a second signal area, respectively. When the self-propelled apparatus enters the first signal area, the self-propelled apparatus yaws to move in a direction toward the second signal area. When the self-propelled apparatus enters the second signal area, the self-propelled apparatus yaws to move in another direction toward the first signal area. When the supersonic receiver receives the supersonic signal from the self-propelled apparatus, the controller drives the central emission module to emit another infrared signal to a third signal area for informing the self-propelled apparatus of entering the third signal range, the controller realizes the supersonic signal to calculate a distance between the self-propelled apparatus and the charging port, and the self-propelled apparatus turns to have a charging-input unit thereof to face the charging port if the distance is smaller than a predetermined distance.

In the present invention, the charging system includes a self-propelled apparatus and a charging station. The self-propelled apparatus includes a supersonic emitter and a charging-input unit, in which the supersonic emitter is to emit a supersonic signal and the charging-input unit is located at a rear side of the self-propelled apparatus. The charging station for charging the self-propelled apparatus includes a main body, a central emission module, a lateral emission module, a supersonic receiver and a controller. The main body includes a charging port. The central emission module is located at the main body at a position corresponding to the charging port. The lateral emission module locates at the main body further includes a left infrared emitter and a right infrared emitter located individually to two opposing sides of the central emission module. The supersonic receiver located at the main body is to receive a supersonic signal emitted by the self-propelled apparatus. The controller located at the main body is coupled with the central emission module, the lateral emission module and the supersonic receiver. The controller drives the left infrared emitter and the right infrared emitter to emit alternatively infrared signals to a first signal area and a second signal area, respectively. When the self-propelled apparatus enters the first signal area, the self-propelled apparatus yaws to move in a direction toward the second signal area. When the self-propelled apparatus enters the second signal area, the self-propelled apparatus yaws to move in another direction toward the first signal area. When the supersonic receiver receives the supersonic signal from the self-propelled apparatus, the controller drives the central emission module to emit another infrared signal to a third signal area for informing the self-propelled apparatus of entering the third signal range, the controller realizes the supersonic signal to calculate a distance between the self-propelled apparatus and the charging port, and the self-propelled apparatus turns to have a charging-input unit thereof to face the charging port if the distance is smaller than a predetermined distance.

In one embodiment of the present invention, when the charging-input unit of the self-propelled apparatus faces the charging port, the self-propelled apparatus slows down to move at a lower moving speed toward the charging port.

In one embodiment of the present invention, the self-propelled apparatus turns to move toward the second signal area if the self-propelled apparatus enters the first signal area, and the self-propelled apparatus turns to move toward the first signal area if the self-propelled apparatus enters the second signal area.

By providing the charging station and the charging system of the present invention, the lateral first signal area and second signal area are applied to guide the self-propelled apparatus to waddle and correct its path to the third signal area. When the supersonic receiver of the charging station receives the supersonic signal from the self-propelled apparatus, the central emission module of the charging station would emit an infrared signal to the third signal area so as to guide the self-propelled apparatus to move in the third signal area. When the distance between the self-propelled apparatus and the charging port is smaller than a predetermined distance, the self-propelled apparatus would turn to allow its charging-input unit to face directly the charging port of the charging station. Then, the self-propelled apparatus would move further in the third signal are so as to engage the charging port for recharging.

All these objects are achieved by the charging station and the charging system described below.

BRIEF DESCRIPTION OF THE DRAWINGS

The present invention will now be specified with reference to its preferred embodiment illustrated in the drawings, in which.

DESCRIPTION OF THE PREFERRED EMBODIMENT

The invention disclosed herein is directed to a charging station and a charging system. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

Figure 1:
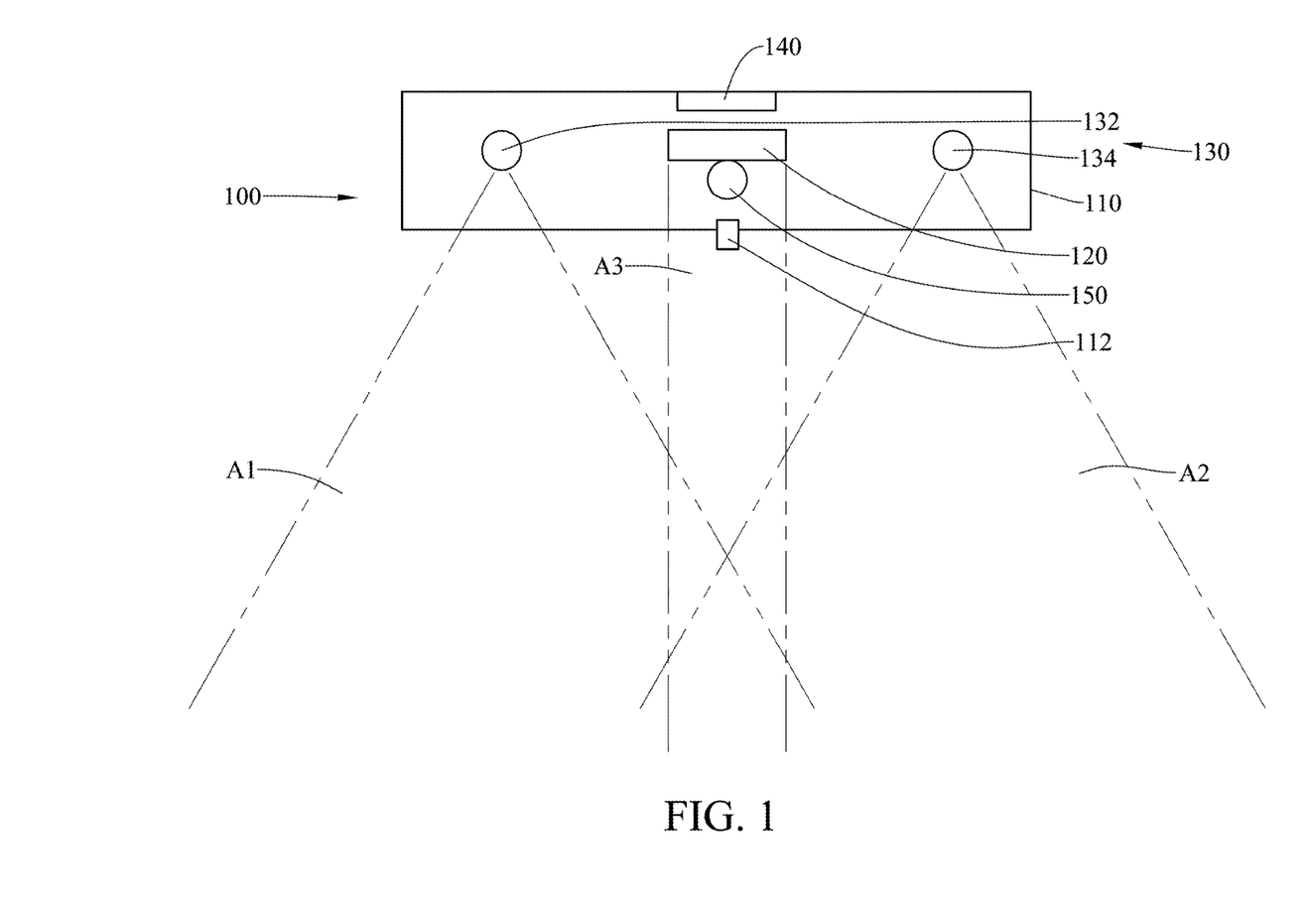
FIG. 1 is a schematic view of the preferred charging station in accordance with the present invention.
Figure 2:
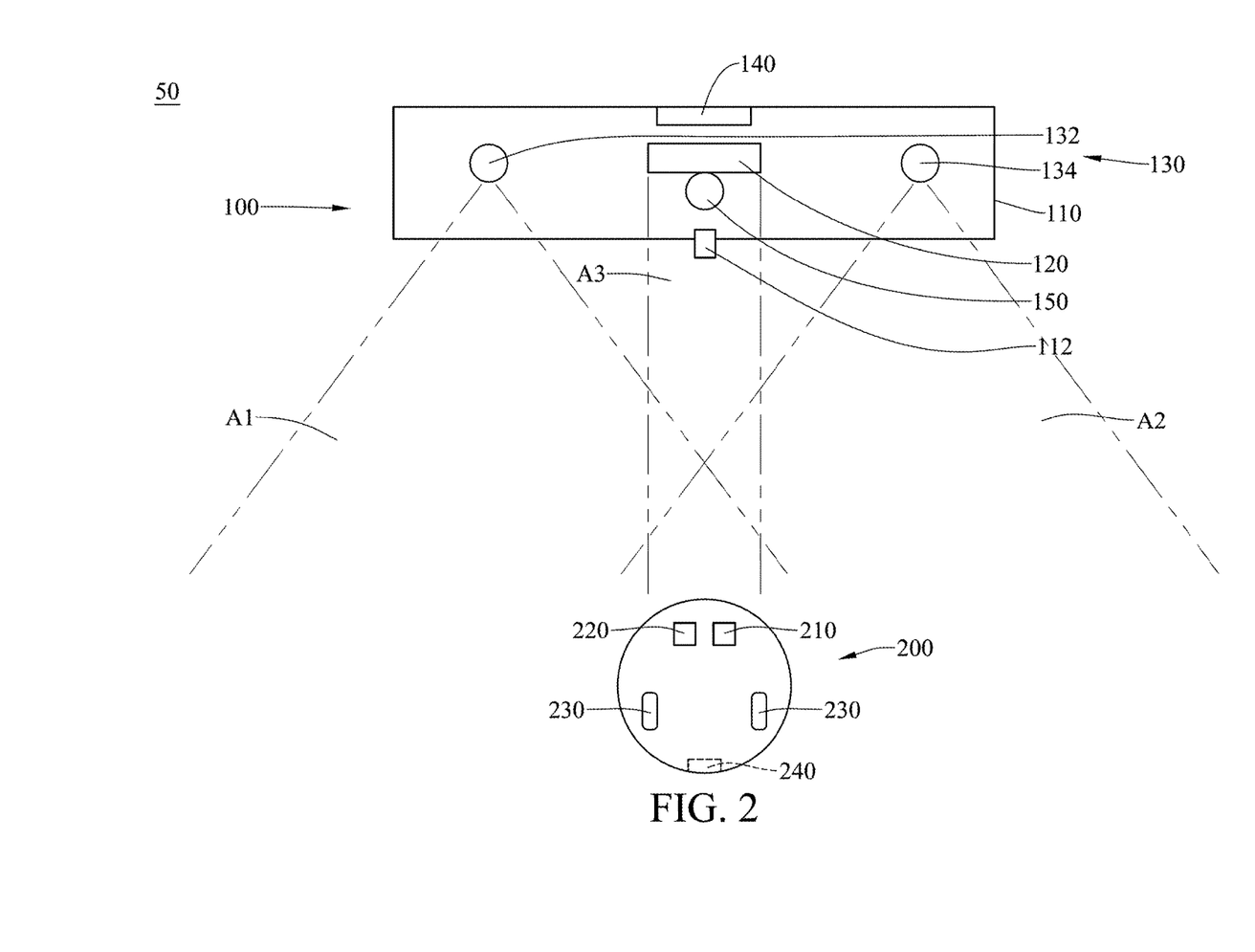
FIG. 2 is a schematic view of the preferred charging system in accordance with the present invention.

Refer now to FIG. 1 and FIG. 2; where FIG. 1 is a schematic view of the preferred charging station in accordance with the present invention, and FIG. 2 is a schematic view of the preferred charging system in accordance with the present invention. In this preferred embodiment, the charging system 50 includes a self-propelled apparatus 200 and a charging station 100.

The self-propelled apparatus 200 can be a robotic cleaner moving on the floor, and include a receiver 210, a supersonic emitter 220, a turning member 230 and a charging-input unit 240. The receiver 210, the supersonic emitter 220, and the turning member 230 are all located at the body of the self-propelled apparatus 200. The charging-input unit 240 is located at a rear side of the body of the self-propelled apparatus 200. The receiver 210 is coupled with the supersonic emitter 220. The turning member 230 can be a wheel. The supersonic emitter 220 is to emit a supersonic signal. In addition, the self-propelled apparatus 200 can further include other infrared emitters (not shown in the figure).

The charging station 100 includes a main body 110, a central emission module 120, a lateral emission module 130, a controller 140 and a supersonic receiver 150.

The main body 110 includes a charging port 112, and can be electrically connected with the municipal electricity system via a relevant plug (not shown in the figure). The self-propelled apparatus 200 is charged through an engagement of the charging-input unit 240 and the charging port 112.

The central emission module 120 located at the main body 110 is in a position corresponding to the charging port 112. The central emission module 120 can be an infrared signal-emitting module. However, in some other embodiments, the central emission module can be designed to a relevant signal-emitting module that meets specific requirements.

The lateral emission module 130 located at the main body 110 can be an infrared signal-emitting module. However, in some other embodiments, the lateral emission module can be designed to a relevant signal-emitting module that meets specific requirements.

In this embodiment, the lateral emission module 130 includes a left infrared emitter 132 and a right infrared emitter 134, located individually to two opposing sides of the central emission module 120.

The supersonic receiver 150 located at the main body 110 is to receive the supersonic signals emitted by the supersonic emitter 220.

The controller 140 located at the main body 110 is coupled with the central emission module 120, the lateral emission module 130 and the supersonic receiver 150.

In this embodiment, the controller 140 drives the left infrared emitter 132 and the right infrared emitter 134 to emit alternatively infrared signals to a first signal area A1 and a second signal area A2, respectively, and has the central emission module 120 to emit infrareds to a third signal area A3. The receiver 210 of the self-propelled apparatus 200 is to receive signals in the first signal area A1, the second signal area A2 and the third signal area A3 of the charging device 100.

The aforesaid first signal area A1 is a coverage area of signals emitted from the left infrared emitter 132, and is to present an inverse V-shape. The aforesaid second signal area A2 is a coverage area of signals emitted from the right infrared emitter 134, and is also to present an inverse V-shape. The size of the first signal area A1 or the second signal area A2 is determined to meet practical requirements.

The aforesaid third signal area A3 is defined by an area between two parallel lines. As shown in FIG. 1 and FIG. 2, the third signal area A3 is overlapped partially with the first signal area A1 and the second signal area A2. The charging port 112 is located in the third signal area A3. In an embodiment not shown herein, the third signal area A3 can be separate to the first signal area A1 and the second signal area A2.

Figure 3:
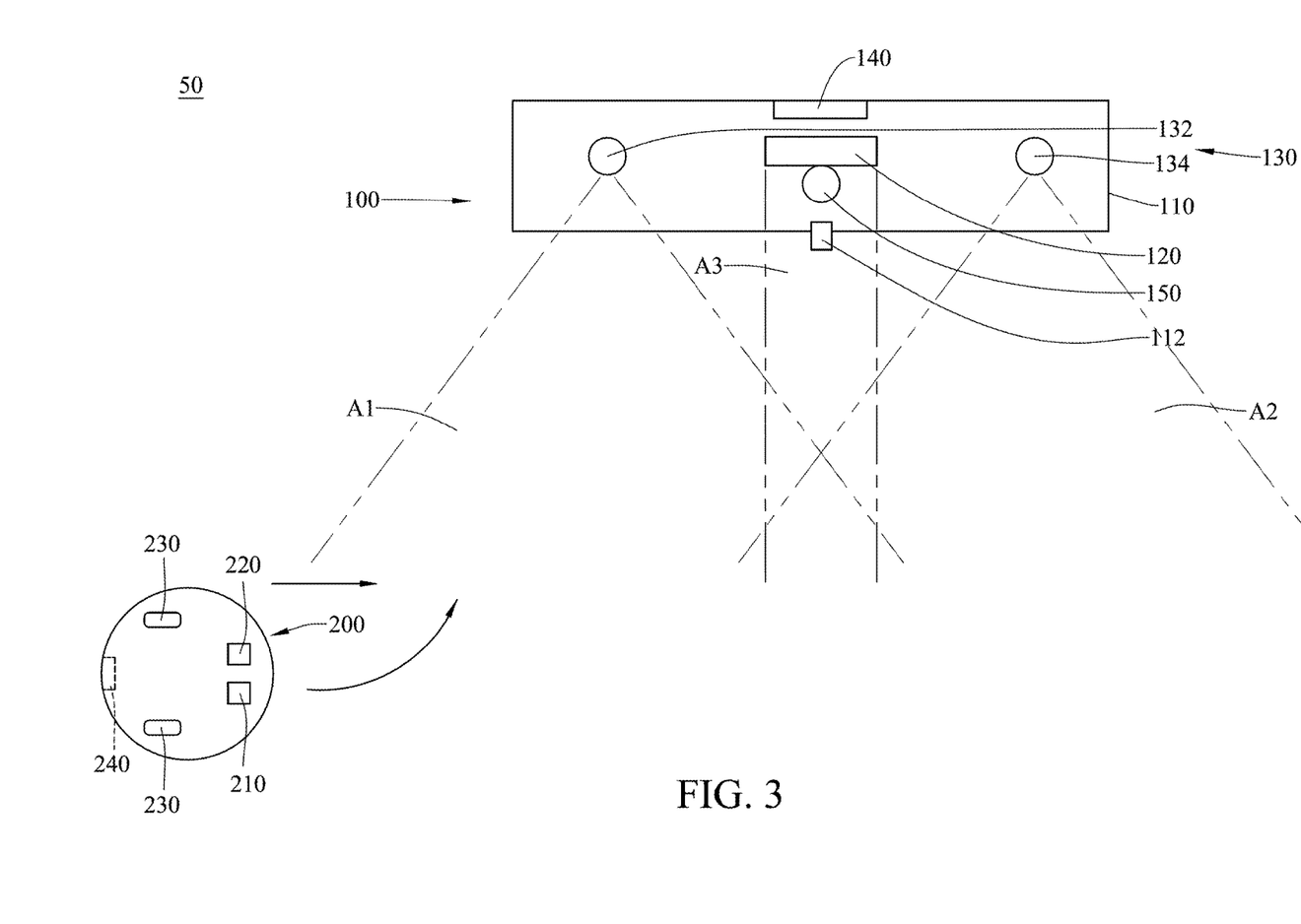
FIG. 3 shows schematically a state of the charging system of FIG. 2.
Figure 4:
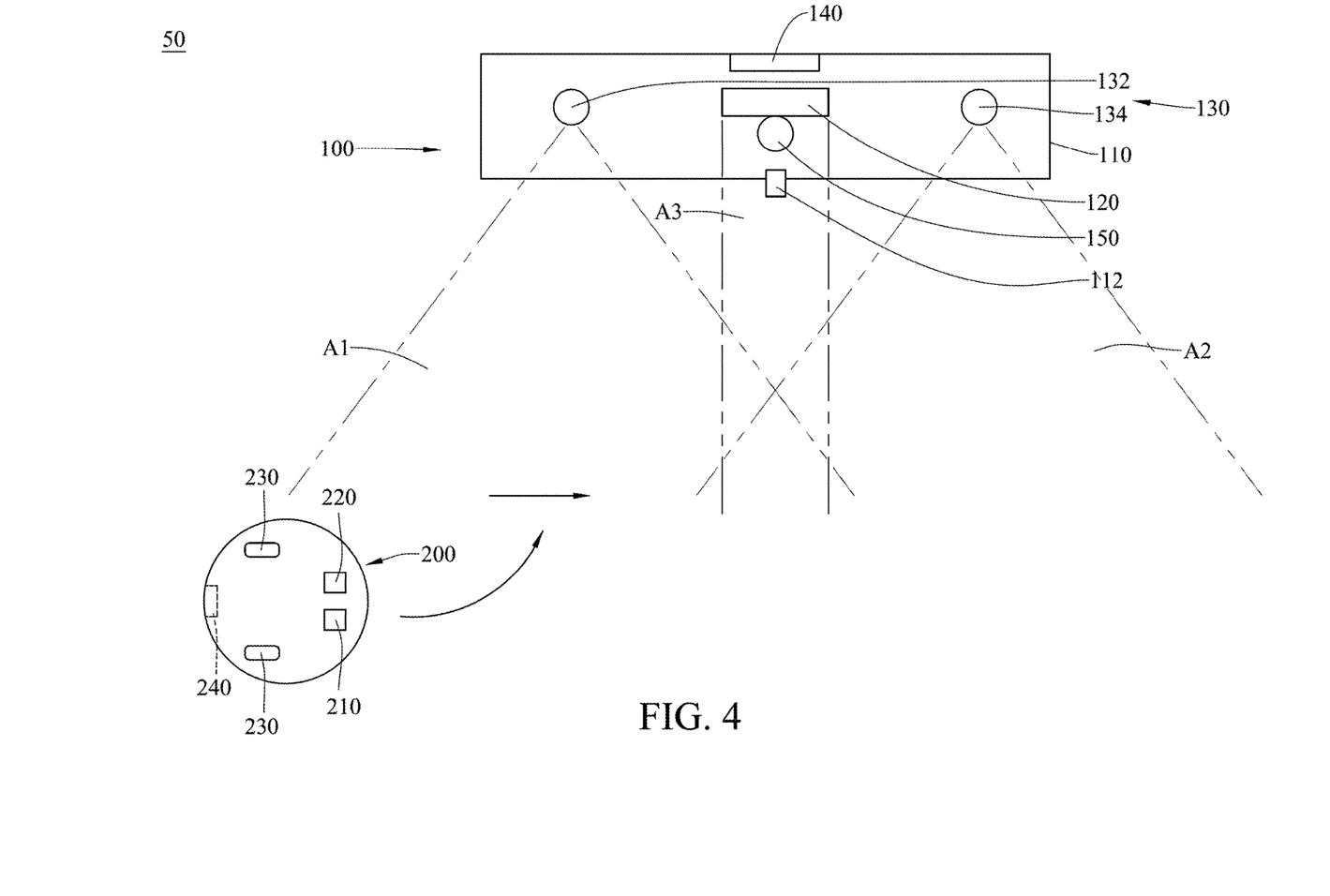
FIG. 4 shows schematically an another state of the charging system of FIG. 2.
Figure 5:
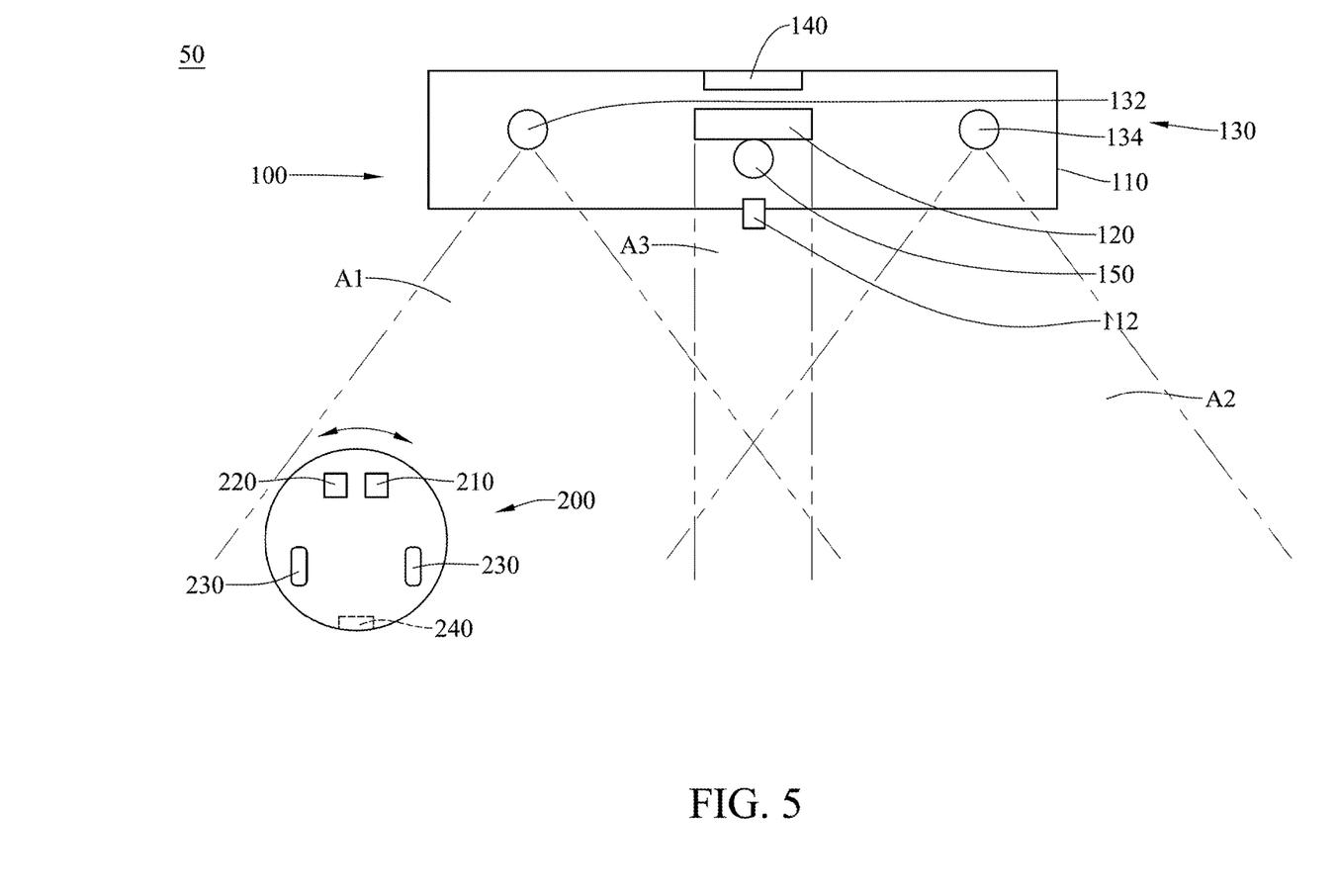
FIG. 5 shows schematically a further state of the charging system of FIG. 2.
Figure 6:
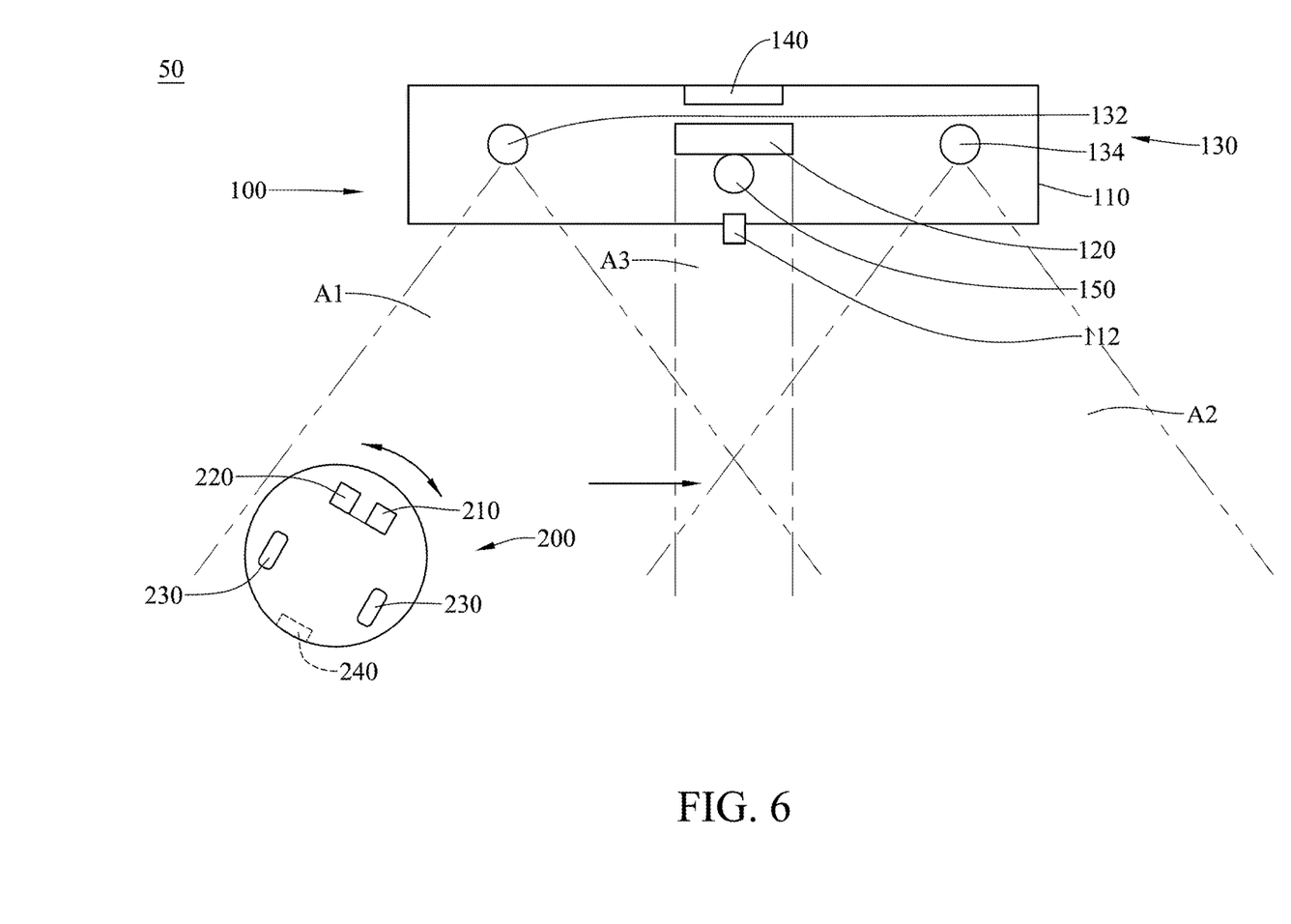
FIG. 6 shows schematically another situation of FIG. 5.
Figure 7:
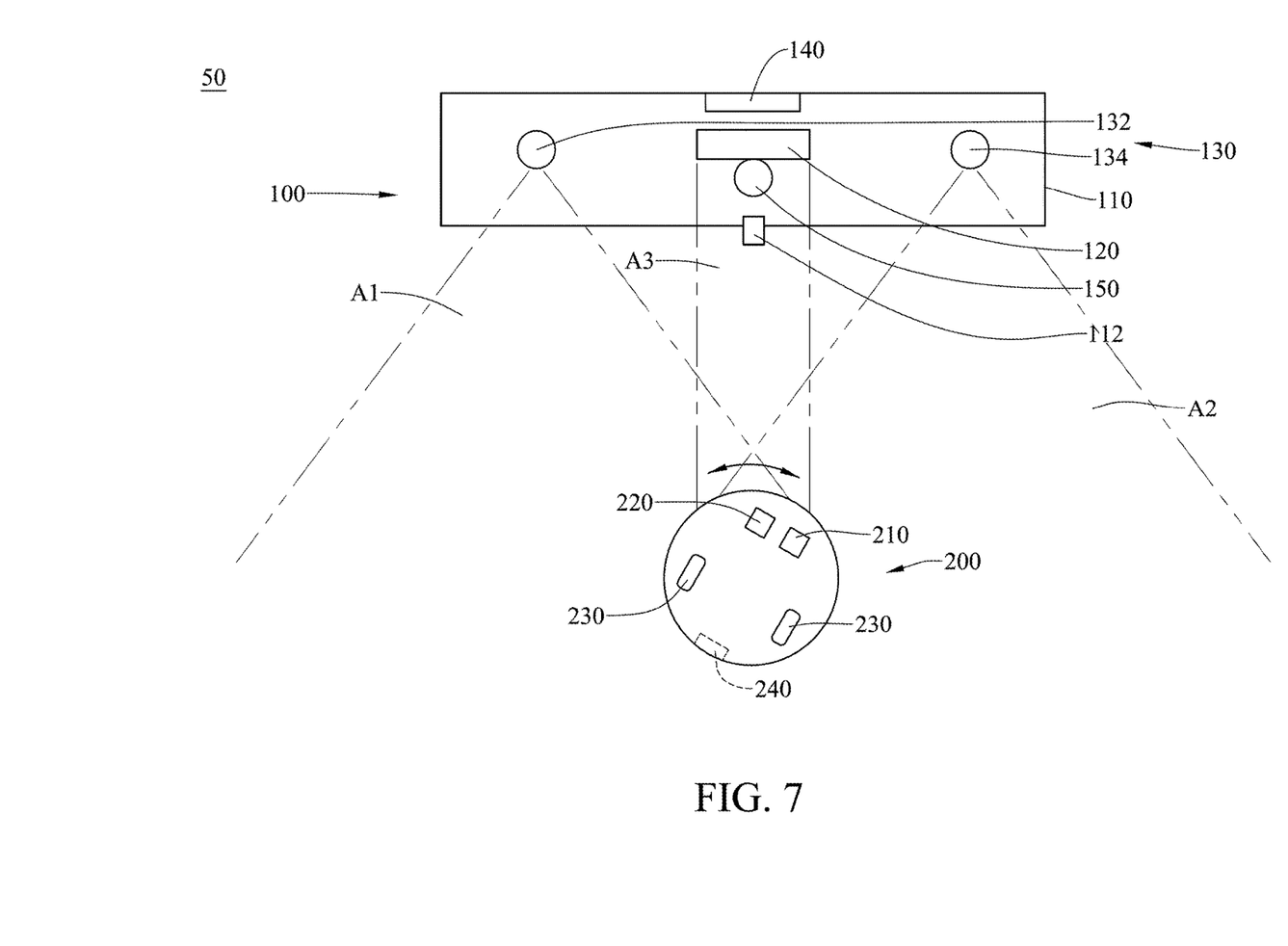
FIG. 7 shows schematically a different state of the self-propelled apparatus of the charging system of FIG. 2.
Figure 8:
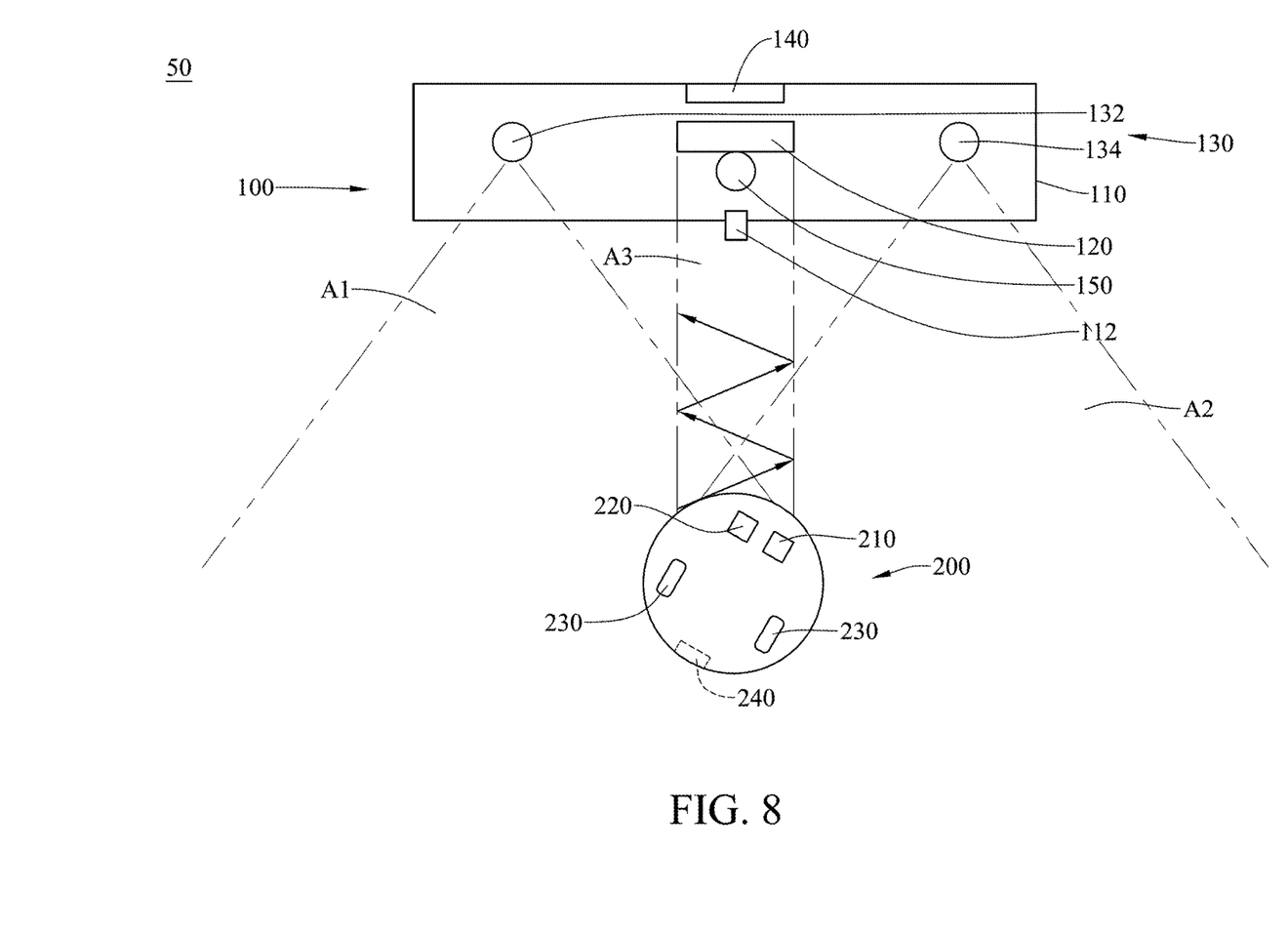
FIG. 8 shows schematically that the self-propelled apparatus is located in the third signal range in the charging system of FIG. 2.
Figure 9:
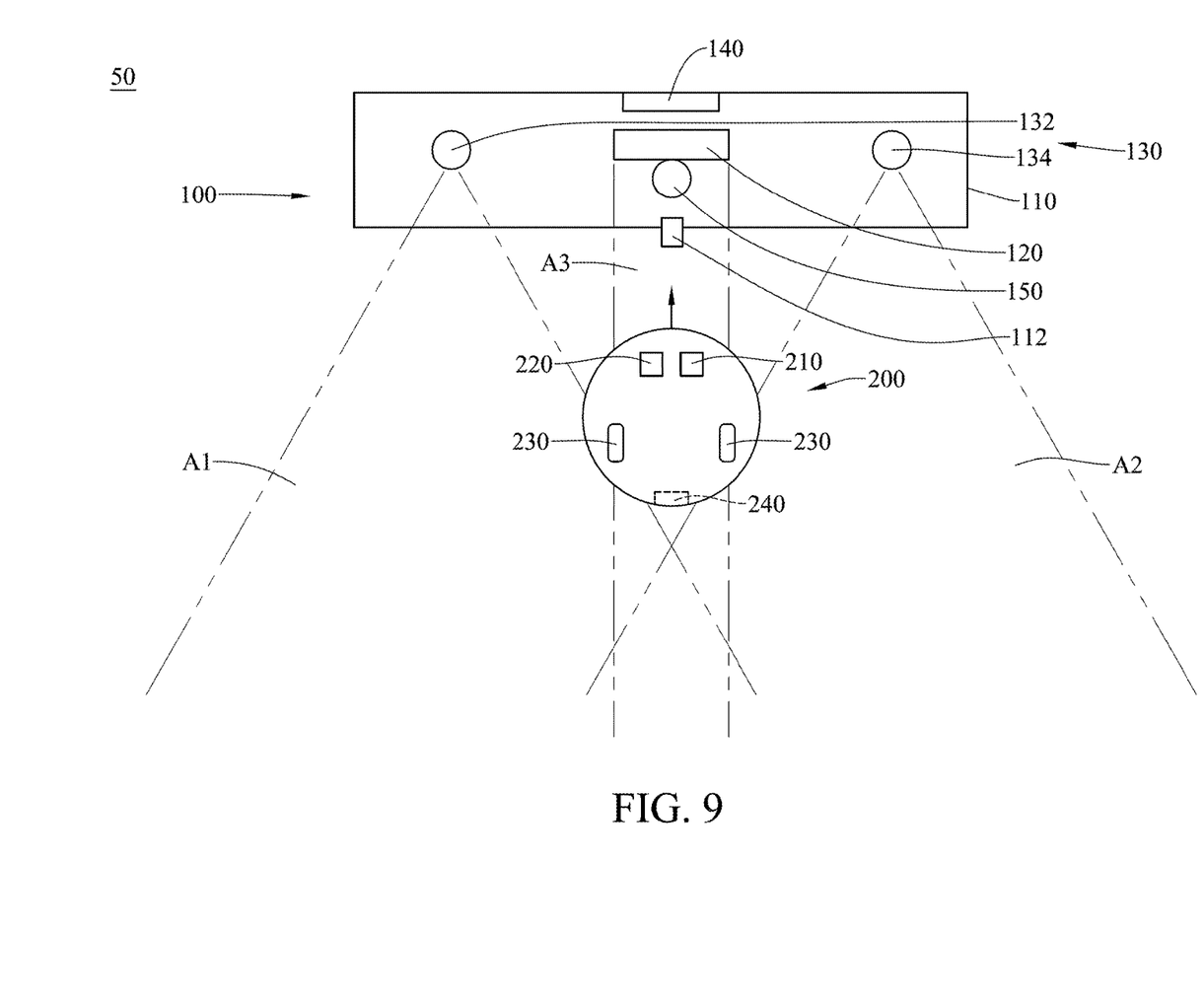
FIG. 9 shows schematically that the self-propelled apparatus is approaching a charging port of the charging station in the charging system of FIG. 2.
Figure 10:
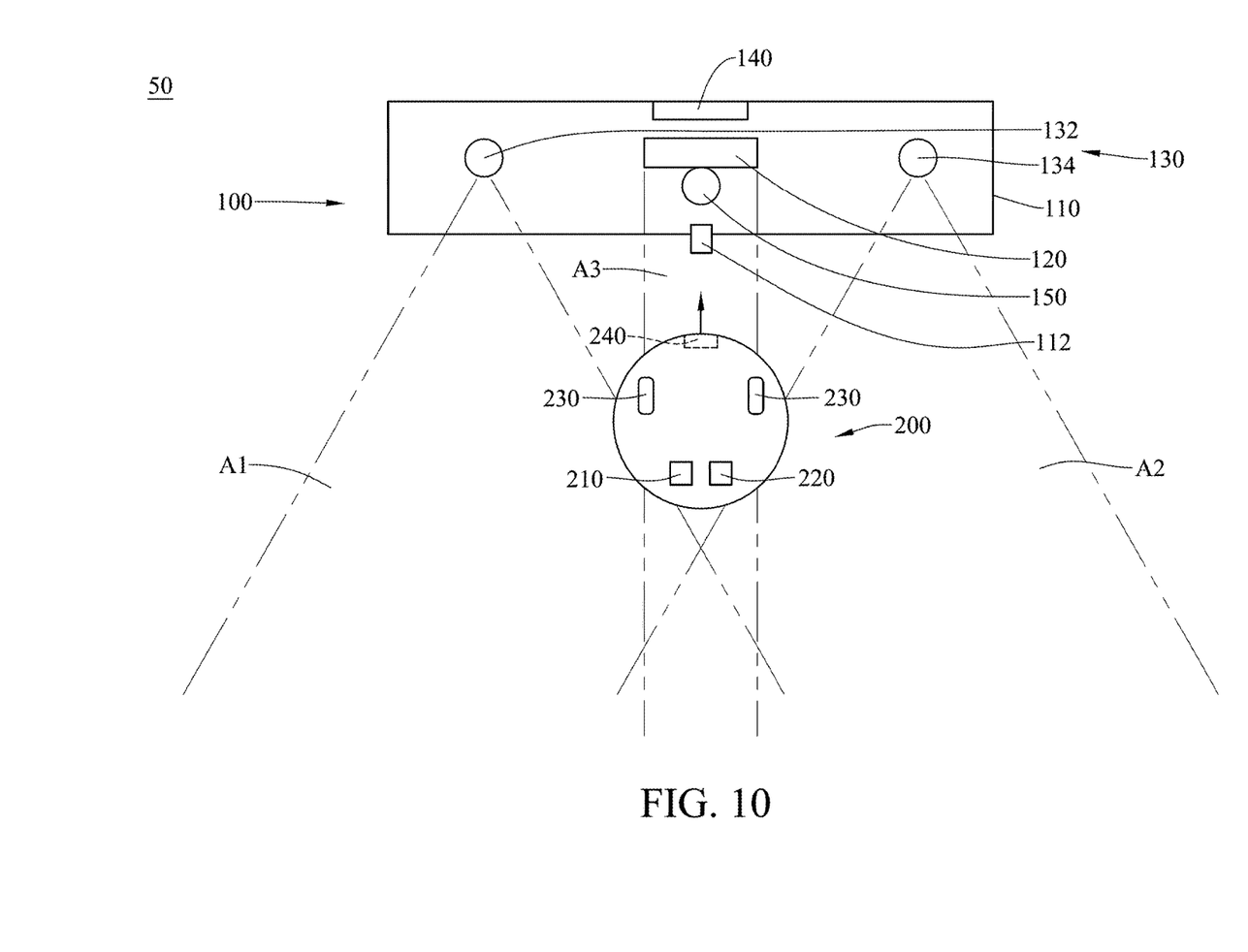
FIG. 10 shows schematically that the self-propelled apparatus of FIG. 9 is rotated by 180 degrees in front of the charging station.
Figure 11:
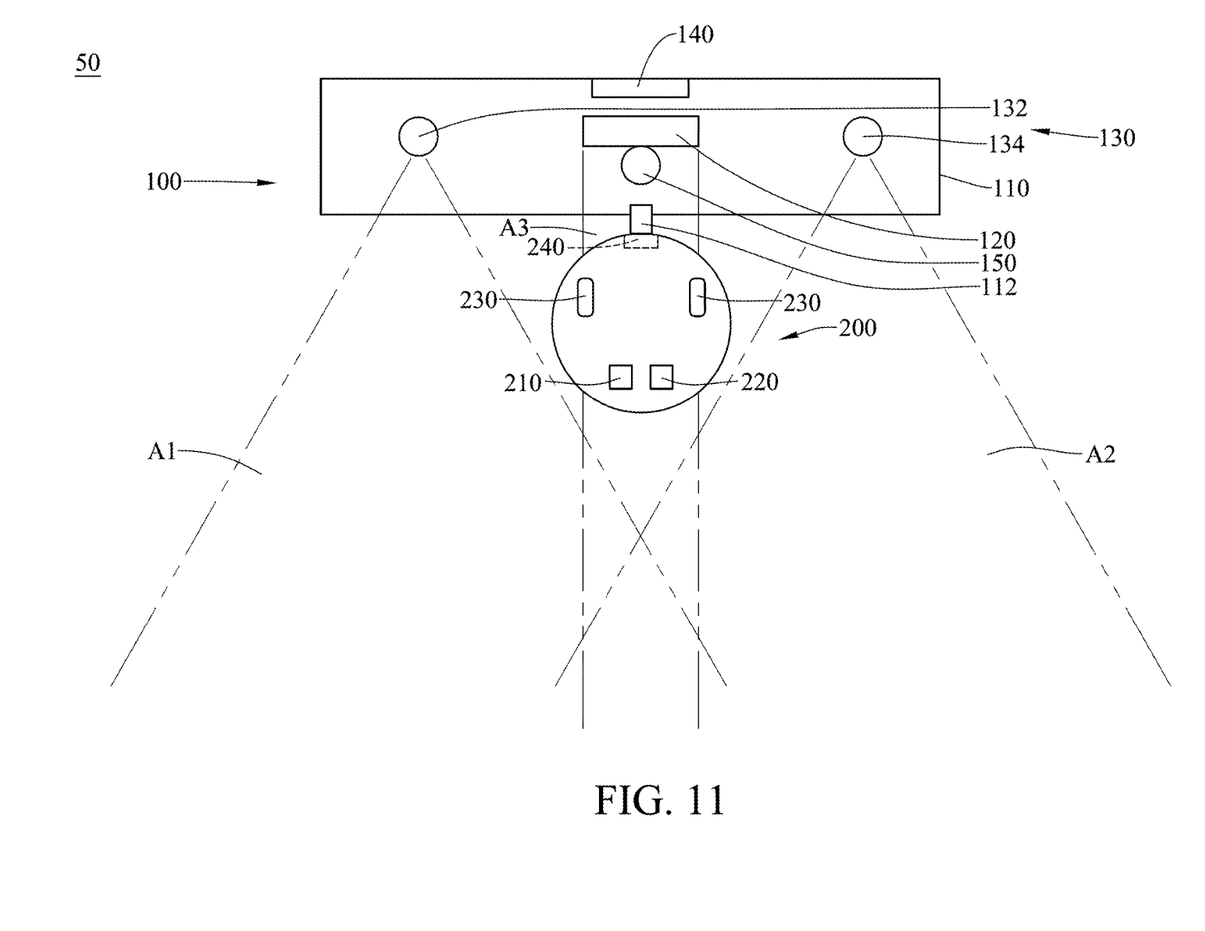
FIG. 11 shows schematically that the self-propelled apparatus engages the charging port of the charging station in the charging system of FIG. 2.

Refer now to FIG. 1 through FIG. 11; where FIG. 3 shows schematically a state of the charging system of FIG. 2, FIG. 4 shows schematically an another state of the charging system of FIG. 2, FIG. 5 shows schematically a further state of the charging system of FIG. 2, FIG. 6 shows schematically another situation of FIG. 5, FIG. 7 shows schematically a different state of the self-propelled apparatus of the charging system of FIG. 2, FIG. 8 shows schematically that the self-propelled apparatus is located in the third signal range in the charging system of FIG. 2, FIG. 9 shows schematically that the self-propelled apparatus is approaching a charging port of the charging station in the charging system of FIG. 2, FIG. 10 shows schematically that the self-propelled apparatus of FIG. 9 is rotated by 180 degrees in front of the charging station, and FIG. 11 shows schematically that the self-propelled apparatus engages the charging port of the charging station in the charging system of FIG. 2.

When the self-propelled apparatus 200 is located outside of the first signal area A1 and the second signal area A2, the self-propelled apparatus 200 can't receive any signal from the charging station 100; no matter whether the self-propelled apparatus 200 is approaching or leaving away the charging station 100.

As shown in FIG. 3, the self-propelled apparatus 200 moves close to and is approaching the first signal area A1.

As shown in FIG. 4, the self-propelled apparatus 200 enters the first signal area A1 and yaws in a direction toward the second signal area A2. For example, the self-propelled apparatus 200 of FIG. 4 is approaching the second signal area A2.

In detail, refer to various move states of the self-propelled apparatus 200 shown in FIG. 4 to FIG. 6. When the self-propelled apparatus 200 enters the first signal area A1, the self-propelled apparatus 200 would turn toward the second signal area A2 by the action of the turning member 230. As shown in FIG. 5, the self-propelled apparatus 200 may firstly yaw to its left, and then finds that the moving direction is not toward the second signal area A2. Thus, the self-propelled apparatus 200 would yaw to its right (as shown in FIG. 6) and correct its moving direction to approach the second signal area A2. Namely, in this embodiment, when the self-propelled apparatus 200 just reaches the first signal area A1, the self-propelled apparatus 200 would waddle firstly to make sure a correct moving direction.

After the foregoing self-propelled apparatus 200 enters the first signal area A1 and yaws to approach the second signal area A2, if the self-propelled apparatus 200 moves further to enter the second signal area A2, then the self-propelled apparatus 200 would yaw back to move toward the first signal area A1. According to the aforesaid moving mode, the self-propelled apparatus 200 would apply its turning member 230 to turn to a moving direction toward the first signal area A1.

Upon the aforesaid arrangement, the self-propelled apparatus 200 would yaw alternatively till a signal received to tell that the third signal area A3 is reached. Referring to the moving processes shown in FIG. 7 and FIG. 8, when the supersonic receiver 150 receives the supersonic signal from the self-propelled apparatus 200, the controller 140 would drive the central emission module 120 to emit an infrared signal to the third signal area A3. Then, as the self-propelled apparatus 200 enters the third signal area A3 confirmed by the receipt of the infrared signal, the self-propelled apparatus 200 would turn to move toward directly the charging port 112.

As the moving processes shown in FIG. 8 and FIG. 9, the controller 140 realizes the supersonic signal to calculate a distance between the self-propelled apparatus 200 and the charging port 112.

When the distance is smaller than a predetermined distance, as shown in FIG. 10, the self-propelled apparatus 200 would turn to have its own charging-input unit 240 to face the charging port 112. In practice, while the self-propelled apparatus 200 moves in the third signal area A3, the controller 140 continuously calculates the distance from a front end of the self-propelled apparatus 200 to the charging port 112. When this distance is smaller than a preset distance, the self-propelled apparatus 200 would slow down to move at a lower moving speed so as to prevent the self-propelled apparatus 200 from hitting the charging port 112 directly due to its inertia. As shown in FIG. 11, finally the charging-input unit 240 of the self-propelled apparatus 200 can electrically engage the charging port 112 for charging the self-propelled apparatus 200.

In summary, by providing the charging station and the charging system of the present invention, the lateral first signal area and second signal area are applied to guide the self-propelled apparatus to waddle and correct its path to the third signal area. When the supersonic receiver of the charging station receives the supersonic signal from the self-propelled apparatus, the central emission module of the charging station would emit an infrared signal to the third signal area so as to guide the self-propelled apparatus to move in the third signal area. When the distance between the self-propelled apparatus and the charging port is smaller than a predetermined distance, the self-propelled apparatus would turn to allow its charging-input unit to face directly the charging port of the charging station. Then, the self-propelled apparatus would move further in the third signal are so as to engage the charging port for recharging.

While the present invention has been particularly shown and described with reference to a preferred embodiment, it will be understood by those skilled in the art that various changes in form and detail may be without departing from the spirit and scope of the present invention.

What is claimed is:
1. A charging station, for charging a self-propelled apparatus, comprising:
   a main body, including a charging port;
   a central emission module, located at the main body at a position corresponding to the charging port;
   a lateral emission module, located at the main body, including a left infrared emitter and a right infrared emitter located individually to two opposing sides of the central emission module;
   a supersonic receiver, located at the main body, being to receive a supersonic signal emitted by the self-propelled apparatus; and
   a controller, located at the main body, coupled with the central emission module, the lateral emission module and the supersonic receiver, driving the left infrared emitter and the right infrared emitter to emit alternatively infrared signals to a first signal area and a second signal area, respectively;

wherein, when the self-propelled apparatus enters the first signal area, the self-propelled apparatus yaws to move in a direction toward the second signal area;

wherein, when the self-propelled apparatus enters the second signal area, the self-propelled apparatus yaws to move in another direction toward the first signal area; and wherein, when the supersonic receiver receives the supersonic signal from the self-propelled apparatus, the controller drives the central emission module to emit another infrared signal to a third signal area for informing the self-propelled apparatus of entering the third signal range, the controller realizes the supersonic signal to calculate a distance between the self-propelled apparatus and the charging port, and the self-propelled apparatus turns to have a charging-input unit thereof to face the charging port if the distance is smaller than a predetermined distance.

2. The charging station of claim 1, wherein, when the charging-input unit of the self-propelled apparatus faces the charging port, the self-propelled apparatus slows down to move at a lower walk speed toward the charging port.

3. A charging system, comprising:
a self-propelled apparatus, including a supersonic emitter and a charging-input unit, the supersonic emitter being to emit a supersonic signal, the charging-input unit located at a rear side of the self-propelled apparatus; and
a charging station, further comprising:
a main body, including a charging port;
a central emission module, located at the main body at a position corresponding to the charging port;
a lateral emission module, located at the main body, including a left infrared emitter and a right infrared emitter located individually to two opposing sides of the central emission module;
a supersonic receiver, located at the main body, being to receive a supersonic signal emitted by the self-propelled apparatus; and
a controller, located at the main body, coupled with the central emission module, the lateral emission module and the supersonic receiver, driving the left infrared emitter and the right infrared emitter to emit alternatively infrared signals to a first signal area and a second signal area, respectively;
wherein, when the self-propelled apparatus enters the first signal area, the self-propelled apparatus yaws to move in a direction toward the second signal area;
wherein, when the self-propelled apparatus enters the second signal area, the self-propelled apparatus yaws to move in another direction toward the first signal area; and
wherein, when the supersonic receiver receives the supersonic signal from the self-propelled apparatus, the controller drives the central emission module to emit another infrared signal to a third signal area for informing the self-propelled apparatus of entering the third signal range, the controller realizes the supersonic signal to calculate a distance between the self-propelled apparatus and the charging port, and the self-propelled apparatus turns to have a charging-input unit thereof to face the charging port if the distance is smaller than a predetermined distance.

4. The charging system of claim 3, wherein, when the charging-input unit of the self-propelled apparatus faces the charging port, the self-propelled apparatus slows down to move at a lower walk speed toward the charging port.

* * * * *